US008976888B2

(12) United States Patent
Zheng et al.

(10) Patent No.: US 8,976,888 B2
(45) Date of Patent: Mar. 10, 2015

(54) METHOD FOR UPLINK MULTI-USER COOPERATION COMMUNICATION

(76) Inventors: Kan Zheng, Beijing (CN); Hang Long, Beijing (CN); Fangxiang Wang, Beijing (CN)

(*) Notice: Subject to any disclaimer, the term of this patent is extended or adjusted under 35 U.S.C. 154(b) by 0 days.

(21) Appl. No.: 14/130,291

(22) PCT Filed: Jun. 30, 2011

(86) PCT No.: PCT/CN2011/076739
§ 371 (c)(1),
(2), (4) Date: Feb. 25, 2014

(87) PCT Pub. No.: WO2013/000173
PCT Pub. Date: Jan. 3, 2013

(65) Prior Publication Data
US 2014/0205033 A1 Jul. 24, 2014

(51) Int. Cl.
*H04B 7/04* (2006.01)
*H04B 1/10* (2006.01)
*H04B 7/15* (2006.01)
*H04B 7/02* (2006.01)
*H04W 88/04* (2009.01)

(52) U.S. Cl.
CPC ............ *H04B 7/0456* (2013.01); *H04W 88/04* (2013.01); *H04B 1/1036* (2013.01); *H04B 7/15* (2013.01); *H04B 7/026* (2013.01); *H04B 7/0417* (2013.01)

USPC ........... 375/267; 375/316; 375/340; 375/341; 375/347; 375/260

(58) Field of Classification Search
USPC ......... 375/316, 340, 341, 347, 349, 259, 260, 375/267
See application file for complete search history.

(56) References Cited

U.S. PATENT DOCUMENTS

| 2009/0047901 A1* | 2/2009 | Yu et al. ............................ 455/7 |
| 2010/0278036 A1* | 11/2010 | Dai et al. ...................... 370/216 |
| 2012/0140810 A1* | 6/2012 | Wang et al. ................... 375/227 |

* cited by examiner

*Primary Examiner* — Siu Lee
(74) *Attorney, Agent, or Firm* — Yanling Jiang

(57) ABSTRACT

The present invention discloses a method for uplink multi-user cooperation communication, including a first, and a second source node and a target node. When transmitting a signal to the target node, the first source node also transmits the signal to the second source node, the second source node changing to a relay node of the first source node and forwarding the signal to the target node; the target node obtains its reception Signal Noise Ratio (SNR) by using a maximal ratio combining mode according to the signal directly transmitted from the first source node and the signal forwarded from the second source node, sets a precoding policy according to the reception SNR, and selects the optimal precoding as a precoding vector which is used when the first source node transmits a signal to the target node.

11 Claims, 6 Drawing Sheets

METHOD FOR UPLINK MULTI-USER COOPERATION COMMUNICATION

BACKGROUND

The present invention relates to the field of wireless communication technology, and more specifically, to a method for uplink multi-user cooperation communication. This application claims priority to PCT International Application No. PCT/CN2011/076739 filed on Jun. 30, 2011, to the extent allowed by law.

Uplink multi-user cooperation communication, provides an approach to leveraging space resources, wherein multiple entities participating in communication share limited resources in a collaborative fashion, so as to increase the utilization efficiency of wireless resources. Uplink multi-user cooperation communication is quite common in traditional mobile communication cellular networks. In uplink multi-user cooperation communication of a single relay node and multiple relay nodes, each node assumes a fixed and single role in the entire signal transmission course, and the division of signal transmitting and processing work between types of nodes is clear. In an actual system, such a clear division of work is closely related to system requirements such as geographical locations and node configurations of nodes.

Source nodes, typically corresponding to mobile stations (MS) in uplink, are distributed at various locations in a cell and have mobility characteristics. As limited by user portability and equipment size, a mobile station has a little difficulty in being configured with high order antennas. Therefore, the number of antenna, elements is rather small, the transmit power is low, and the signal processing complexity at the source node side should not be too great. In addition, due to confidentiality restrictions on information communicated between mobile station users, multiple source nodes could not transmit signals to each other.

Relay nodes correspond to relay stations (RN) that are disposed in traditional mobile communication cellular cells. Relay stations are fixedly located and are especially disposed in some specific areas or used when a large user density leads to access congestion. A relay node should be have certain signal processing capabilities, with the signal processing complexity ranging between a source node and a target node. Since most relay nodes are for signal processing operations, with respect to relay stations, the implementation of high layer protocols is not as important as mobile stations and base stations.

Targ et nodes, corresponding to base stations (BS) in traditional mobile communication cellular networks, are usually disposed at fixed locations in a cell, slightly restricted by size and transmit power, can be equipped with high order antennas and have higher signal processing complexity. For an uplink multi-user cooperation system, a base station should have a strong multi-stream detection and processing capacity so as to differentiate multiple data streams of multiple mobile station users of uplink access.

However, capacity potential contained in current cooperation communication has not been fully developed and utilized, and the fixation of relay nodes occupies resources of system communication which are already rather limited. Therefore, how to release relay nodes becomes a burning problem. Moreover, precoding technology can also effectively increase the system spectral efficiency by leveraging channel status information. Therefore, it becomes another burning problem as to how to enhance the system capability and throughput and reduce the bit error rate by designing appropriate precoding.

SUMMARY

In view of this, the present invention is intended to provide a method for uplink multi-user cooperation communication, which can effectively increase the system capability and throughput and decrease the bit error rate.

To achieve the above object, a method for uplink multi-user cooperation communication of the present invention is applied in a system at least including a first source node, a second source node and a target node, wherein there is a direct transmission link between either the first or the second source node and the target node. The method includes the following steps: when transmitting a signal to the target node, the first source node also transmits the signal to the second source node, the second source node changing to a relay node of the first source node and forwarding the signal to the target node; according to the signal directly transmitted from the first source node and the signal forwarded from the second source node, the target node obtains its reception Signal Noise Ratio (SNR) by using a maximal ratio combining mode, sets a precoding policy according to the reception SNR, and selects, based on real-time channel conditions, the optimal precoding as a precoding vector which is used when the first source node transmits a signal to the target node.

Further, the step where the first source node also transmits a signal to the second source node when transmitting the signal to the target node comprises: the first source node transmitting the signal to the target node and the second source node after precoding-processing the signal with an initially set first precoding vector, the first precoding vector adopting a first right singular vector of a channel transfer matrix of a direct transmission link between the first source node and the target node.

Further, the first right singular vector of the channel transfer matrix is obtained by singular value decomposing the channel transfer matrix of the direct transmission link between the first source node and the target node.

Further, both the target node and the second source node adopt a matched filtering mode to receive the signal transmitted from the first source node.

Further, both the first source node and the second source node adopt a closed loop transmission mode to transmit signals.

Further, the step of the second source node changing to a relay node of the first source node and forwarding the signal to the target node comprises: the second source node normalizing the received signal, precoding-processing the received signal with an initially set second precoding vector and then forwarding it to the target node, the second precoding vector adopting a first right singular vector of a channel transfer matrix of a direct transmission link between the second source node and the target node.

Further, the first right singular vector of the channel transfer matrix is obtained by singular value decomposing the channel transfer matrix of the direct transmission link between the second source node and the target node.

Further, the second source node normalizing the received signal comprises: setting an amplify-and-forward coefficient such that the signal forwarded by the second source node meets a normalization condition.

Further, the step of the second source node changing to a relay node of the first source node and forwarding the signal to the target node further comprises: obtaining a U matrix by singular-value-decomposing the channel transfer matrix of the direct transmission link between the second source node and the target node, the target node using a conjugate transpose vector of the first column of the U matrix to receive the signal forwarded by the second source node.

Further, the step of selecting the optimal precoding as a precoding vector which is used when the first source node transmits a signal to the target node comprises: selecting the optimal precoding as a first precoding vector. After selecting the optimal precoding as a precoding vector which is used when the first source node transmits a signal to the target node, there is further comprised: obtaining reception Signal to Noise Ratio of the target node under a current channel condition according to the optimal precoding.

Compared with the existing scheme, the present invention can produce the following technical effects:

Before transmission, no fixed relay node needs to be disposed in the network, and the two source nodes are in an equivalent place, i.e., they both need to transfer their information to the target node. During transmission, the source nodes build a cooperative relationship, each of them assumes the signal relay transmission task of the other source node, and the source nodes may exchange information. By virtue of the cooperative relationship between the source nodes, the transmission role of the source node in the present invention is not fixed; that is, the source node may act as a temporary relay node in some specific transmission phases. In this manner, it is possible to effectively enhance the capacity and throughput of the system and reduce the bit error rate.

DETAILED DESCRIPTION

Further illustration is presented below to the present invention in conjunction with the accompanying drawings and concrete embodiments.

The embodiments of the present invention are explained in detail with reference to the figure depictions and embodiments, so as to obtain a comprehensive understanding of and implement the process of how the present invention leverages technical means to solve the technical problem and achieve technical effects.

The core concept of the present invention is as below: when transmitting signals to a target node, a first source node also transmits the signals to a second source node, the second source node changing to a relay node of the first source node and forwarding the signals to the target node; according to the signals directly transmitted from the first source node and the signals forwarded from the second source node, the target node obtains its reception Signal Noise Ratio (SNR) by using a maximal ratio combining mode, sets a precoding policy according to the reception SNR, and selects, based on the real-time channel condition, the optimal precoding as the precoding vector which is used when the first source node transmits the signals to the target node.

There is a direct transmission link from each of the first and second source nodes to the target node.

Figure 1:
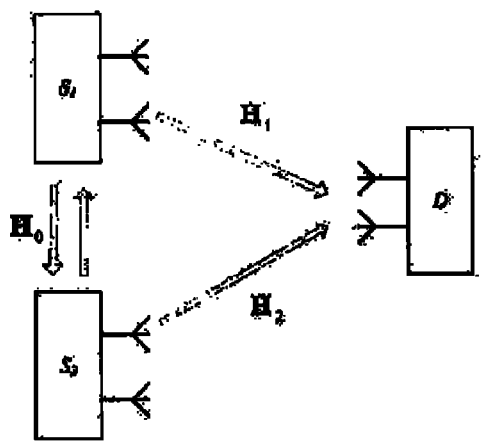
FIG. 1 is a schematic view of a wireless communication system where the present invention is applied.

With reference to FIG. 1, first, illustration is presented to the invention scenario of the present invention. The method of the present invention is applied in a system at least including a first source node $S_1$, a second source node $S_2$ and a target node D, wherein there exist direct transmission links $H_1$, $H_2$ from $S_1$, $S_2$ to the target node D respectively, a channel transfer matrix from the source node $S_1$ to the source node $S_2$ is marked as $H_0$, and a channel transfer matrix from the source node $S_2$ to the source node $S_1$ is marked as $H_0^T$. The node amounts of the source nodes and the target node are 2 and 1, respectively. The antenna amounts of each node are $N_S$ and $N_D$, respectively. Suppose a transmitter signal of the source node is $x_S$, then the transmission signal power of the source node meets $E(x_S^H \cdot x_S) = N_S$.

Figure 2:
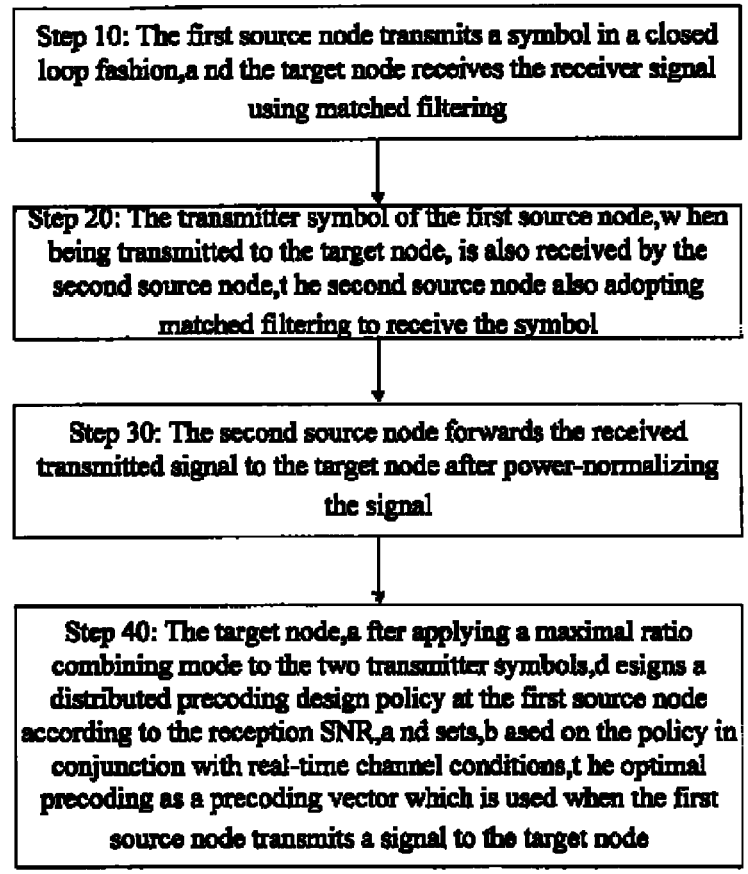
FIG. 2 is a method flowchart of the overall scheme of the embodiments of the present invention.

FIG. 2 shows a method flowchart of the entire solution of the present invention. Operations are performed as below:

In step 10, a first source node sends a symbol to a target node in a closed loop fashion, and the target node receives a reception signal using matched filtering.

The first source node performs precoding processing to the signal with an initially set first precoding vector, the first precoding vector adopting a first right singular vector of a channel transfer matrix of a direct transmission link between the first source node and the target node; singular value decomposition may be performed to the channel transfer matrix to obtain the first right singular vector of the channel transfer matrix.

In step 20, by means of broadcast advantage of a wireless propagation environment, when being sent from the first source node to the target node, the transmission symbol is received by a second source node as well, the second source node also receiving the transmission symbol using matched filtering.

In step 30, the second source node forwards the received transmittion signal to the target node after power normalizing it.

The forwarding process of the second source node is a closed loop transmission, wherein the received transmittion signal is forwarded to the target node after being precoding processed with an initially set second precoding vector, the second precoding vector adopting a first right singular vector of a channel transfer matrix of a direct transmission link between the second source node and the target node.

After performing SVD (singular value) decomposition to the channel matrix, a U matrix is obtained, and the target node uses a conjugate transpose vector of the first column of the U matrix to receive the signal forwarded from the second source node.

In step 40, the target node now has two transmittion symbols of the first source node, one being transmitted from the first source node to the target node directly in step 10, the other being forwarded by the second source node to the target node in step 30; after applying a maximal ratio combining mode to the two transmittion symbols, the target node designs a distributed precoding design policy at the first source node according to the reception Signal Noise Ratio, and sets, according to the policy in conjunction with the real-time channel condition, the optimal precoding as the first precoding vector which is used when the first source node transmits signals to the target node, so as to enhance the capability and throughput of the system and reduce the block error rate.

After step 40, there may be further comprised: obtaining, according to the optimal precoding, the accurate reception Signal Noise Ratio of the target node under a current channel condition.

In the above flow, with reference to the application scenario in FIG. 1, when $S_1$ acts as the first source node in the above flow, then $S_2$ acts as the second source node in the above flow and is changed to a relay node; when $S_2$ acts as the first source node in the above flow, then S acts as the second source node in the above flow and is changed to a relay node.

The overall scheme of the present invention is illustrated below in the context of an embodiment.

Consider a most simple multi-user mutual cooperation uplink multi-user cooperation system that consists of three nodes, wherein two source nodes need to send respective data to a target node. The two source nodes may exchange information when necessary, and when necessary, one source node may be changed to a relay node of the other source node for forwarding a transmitter signal of the other source node to the target node. Each of the source nodes has a direct transmission link to the target node. Each network node is equipped with 2 antennas in order to be conveniently applied in multi-antenna technology.

The protocol of the source node mutual cooperation scheme designed by the present invention is divided into four transmission phases:

Transmission phase I: $S_1$ sends a symbol $x_1$ to $S_2$ and D in a closed loop fashion;

Transmission phase II: $S_2$ sends a symbol $x_2$ to $S_1$ and D in a closed loop fashion;

Transmission phase III: $S_2$ forwards to D a transmission symbol of $S_1$ in a closed loop fashion; and Transmission phase IV: $S_1$ forwards to D a transmission symbol of $S_2$ in a closed loop fashion.

Transmission Phase I

In the first transmission phase, the source node $S_1$ sends a symbol to the target node in a closed loop fashion, the transmission precoding is a first right singular vector of a corresponding channel transfer matrix, and the target node receives the signal using matched filtering.

By means of broadcast advantage of a wireless propagation environment, when being sent to the target node after being precoding processed, the transmittion symbol of the source node $S_1$ is also received by the source node $S_2$ using matched filtering.

Transmission Phase II

In the second transmission phase, the source node $S_2$ sends a symbol to the target node in a closed loop fashion, its precoding matrix adopting a first right singular vector of a corresponding channel transfer matrix. The target node receives the signal using matched filtering.

By means of broadcast advantage of a wireless propagation environment, when being sent to the target node after being precoding processed, the transmittion symbol of the source node $S_2$ is also received by the source node $S_1$ using matched filtering.

Transmission phase III

In the third transmission phase, the source node $S_2$ forwards to the target node a transmitter signal estimated value of S which has been power normalized. The forwarding process of $S_2$ is a closed loop transmission, and a first right singular vector of a channel transfer matrix from $S_2$ to the target node is used as the precoding vector which is used when $S_2$ forwards the transmitter signal of $S_1$. The target node receives the transmitter signal by using a conjugate transpose vector of the first column of a U matrix resulting from SVD decomposition of a corresponding channel matrix.

Now the target node has two estimates of the transmittion symbols of the source node $S_1$: one is transmitted by the source node $S_1$ directly to the target node in the transmission phase I; and the other is forwarded by the source node $S_2$ to the target node in the transmission phase III. After applying a maximal ratio combining mode to the estimates of the two transmittion symbols, the target node designs, according to the reception Signal Noise Ratio, a distributed precoding design policy at the source node $S_1$ in the transmission phase I.

Transmission Phase IV

Like the third transmission phase, in the fourth transmission phase, the source node $S_1$ forwards to the target node of an estimated value of the transmitter signal $x_2$ that comes from $S_2$ and is received in the second phase. The forwarding process of $S_1$ adopts a closed loop transmission mode, the first right singular vector of the channel transfer matrix from $S_1$ to the target node acts as the precoding matrix that is used when S forwards the transmitter signal of $S_2$, and the target node receives the transmitter signal by using conjugate transpose of the first column of the U matrix resulting from decomposing the corresponding channel matrix SVD. Now the target node has two estimates of the transmittion symbols $x_2$ of the source node $S_2$: one is transmitted by the source node $S_2$ directly to the target node in the transmission phase II; and the other is forwarded by the source node $S_1$ to the target node in the transmission phase IV. After applying a maximal ratio combining mode to the estimates of the two transmittion symbols, the target node designs, according to the reception Signal Noise Ratio, a distributed precoding design policy at the source node $S_2$ in the transmission phase II.

Now the present invention is illustrated in the context of an application instance.

In the above system scenario as shown in FIG. 1, the method of the present invention is applied in a system at least including a first source node $S_1$, a second source node $S_2$ and a target node D, wherein the node amounts of the source nodes and the target node are 2 and 1, respectively. The antenna amounts of each node are $N_S$ and $N_D$, respectively. Suppose a transmitter signal of the source node is $x_S$, then the transmission signal power of the source node meets $E(x_S^H \cdot x_S) = N_S$. Suppose there exist direct transmission links from the two source nodes to the target node, and a channel transfer matrix of a direct transmission link from the $i(i \in \{1, 2\})^{th}$ source node to the target node is termed $H_i$. For the purpose of differentiation, a channel transfer matrix from the source node $S_1$ to the source node $S_2$ is marked as $H_0$, and according to the channel duality, a channel transfer matrix from the source node $S_2$ to the source node $S_1$ is marked as $H_0^T$.

A scheme where the two source nodes perform closed loop access by their respective direct transmission links to the target node is termed a direct access scheme, whereas the cooperation communication method of the present invention is termed a cooperation access scheme. To demonstrate technical advantages of the cooperation access scheme of the present invention by comparison, the direct access scheme and the cooperation access scheme are illustrated respectively, and technical advantages of the cooperation communication method of the present invention are explained with reference to FIGS. 3-7.

1) Direct Access Scheme

As a comparison scheme, two source nodes separately transmit their respective transmittion symbols without information exchange and cooperation transmission. Specifically, the source nodes $S_1$ and $S_2$ transmit the symbols $x_1$ and $x_2$ respectively in a closed loop fashion, each uses a first right singular vector of a channel matrix for concentrated energy emission and sends a single data stream to the target node.

Subject a spatial channel transfer matrix from each source node to the target node to SVD decomposition:

$$U_1 S_1 V_1^H = H_1,$$

$$U_2 S_2 V_2^H = H_2, \quad (1)$$

Then, transmission precoding matrixes $p_1$ and $p_2$ of $S_1$ and $S_2$ each are a fist right singular vector of a corresponding channel transfer matrix:

$$p_1 = V_1(:,1),$$

$$p_2 = V_2(:,1), \quad (2)$$

Thereby, the reception signal of the target node can be characterized as:

$$y_D = H_1 p_1 x_1 + H_2 p_2 x_2 + n_D \quad (3)$$

$$= \underbrace{[H_1 p_1 \quad H_2 p_2]}_{H_{eq}} \begin{bmatrix} x_1 \\ x_2 \end{bmatrix} + n_D$$

To remove interference between two streams, the target node performs zero-forcing (ZF) equalization. That is, at the target node:

$$\begin{bmatrix} \hat{x}_1 \\ \hat{x}_2 \end{bmatrix} = G_D y_D = H_{eq}^{-1} y_D = \begin{bmatrix} x_1 \\ x_2 \end{bmatrix} + H_{eq}^{-1} n_D \quad (4)$$

Where $G_D$ denotes an equalization matrix of the target node, $H_{eq}$ characterizes an equivalent channel which an equivalent transmittion symbol of the source node has gone through, and $n_D$ denotes reception noise of the target node.

The postprocessed SNR of data streams transmitted by the two source nodes can be derived from the above equation:

$$SINR_i = \frac{1}{\|H_{eq}^{-1}(i,:)\|_F^2 \sigma^2}, \; i \in \{1, 2\} \quad (5)$$

Where $\|\cdot\|_F$ denotes a norm, and $\sigma$ denotes noise power.

2) Cooperation Access Scheme

To be discussed below is a source nodes mutual cooperation scheme. For differentiation, a scheme where two source nodes utilize their respective direct transmission links to a target node for closed loop access is termed a direct access scheme. Distributed precoding scheme design policies of the source nodes $S_1$ and $S_2$ are analyzed below during the discussion for the signal processing of respective transmission phases.

Transmission Phase I

In the first transmission phase, the source node $S_1$ sends the symbol $x_1$ to the target node in a closed loop fashion. The transmission precoding is a first right singular vector of the corresponding channel transfer matrix $H_1$:

$$U_1 S_1 V_1^H = H_1,$$

$$p_1 = V_1(:,1), \quad (6)$$

The target node's reception signal for the transmittion symbol of $S_1$ is $$y_{D_1} = H_1 p_1 x_1 + n_{D_1} \quad (7)$$

Where $n_{D_1}$ denotes the target node's reception noise for the symbol $x_1$ directly sent from $S_1$.

The target node receives the reception signal using matched filtering:

$$\hat{x}_{1,D_1} = (H_1 p_1)^H y_{D_1} \quad (8)$$

$$= p_1^H H_1^H H_1 p_1 x_1 + p_1^H H_1^H n_{D_1}$$

Therefore, the SNR with respect to the transmittion symbol $x_1$ of the source node $S_1$ at the target node is:

$$\gamma_{1,D} = \frac{\|p_1^H H_1^H H_1 p_1\|_F^2}{\|p_1^H H_1^H\|_F^2 \sigma^2} = \frac{\|H_1 p_1\|_F^2}{\sigma^2} \quad (9)$$

Where $\|\cdot\|_F$ denotes a norm, and $\sigma$ denotes noise power.

By virtue of broadcast advantage of a wireless propagation environment, the transmittion symbol $x_1$ of the source node $S_1$, when being sent to the target node through precoding, is also received by the source node $S_2$. The reception signal of $S_2$ for the transmittion symbol of $S_1$ is:

$$y_{S_2} = H_0 p_1 x_1 + n_{S_2} \quad (10)$$

Where $n_{S_2}$ denotes the reception noise of the source node $S_2$ with respect to the symbol $x_1$ sent from $S_1$.

Likewise, the source node $S_2$ receives the symbol $x_1$ using matched filtering:

$$\hat{x}_{1,S_2} = (H_0 p_1)^H y_{S_2} \quad (11)$$

$$= p_1^H H_0^H H_0 p_1 x_1 + p_1^H H_0^H n_{S_2}$$

Thus, the SNR of the source node $S_2$ with respect to the transmitter signal $S_1$ is:

$$\gamma_{1,S_2} = \frac{\|p_1^H H_0^H H_0 p_1\|_F^2}{\|p_1^H H_0^H\|_F^2 \sigma^2} = \frac{\|H_0 p_1\|_F^2}{\sigma^2} \quad (12)$$

Where $\|\cdot\|_F$ denotes a norm, and $\sigma$ denotes noise power.

Transmission Phase II

In the second transmission phase, the source node $S_2$ sends the symbol $x_2$ to the target node in a closed loop fashion, and its precoding matrix adopts a first right singular vector of the corresponding channel transfer matrix $H_2$:

$$U_2 S_2 V_2^H = H_2,$$

$$p_2 = V_2(:,1), \quad (13)$$

The target node's reception signal for the transmittion symbol of $S_2$ is:

$$y_{D_2} = H_2 p_2 x_2 + n_{D_2} \quad (14)$$

Where $n_{D_2}$ denotes the target node's reception noise for the symbol $x_2$ directly sent from $S_2$.

The target node receives the reception signal using matched filtering:

$$\hat{x}_{2,D_2} = (H_2 p_2)^H y_{D_2} \quad (15)$$
$$= p_2^H H_2^H H_2 p_2 x_2 + p_2^H H_2^H n_{D_2}$$

Therefore, the SNR with respect to the transmission symbol $x_2$ of the source node $S_2$ at the target node is:

$$\gamma_{2,D} = \frac{\|p_2^H H_2^H H_2 p_2\|_F^2}{\|p_2^H H_2^H\|_F^2 \sigma^2} = \frac{\|H_2 p_2\|_F^2}{\sigma^2} \quad (16)$$

Where $\|\cdot\|_F$ denotes a norm, and $\sigma$ a denotes noise power.

By virtue of broadcast advantage of a wireless propagation environment, the transmittion symbol $x_2$ of the source node $S_2$, when being sent to the target node through precoding, is also received by the source node $S_1$. The reception signal of $S_1$ for the transmittion symbol of $S_2$ is:

$$y_{S_1} = H_0^T p_2 x_2 + n_{S_1} \quad (17)$$

Where $n_{S_1}$ denotes the reception noise of the source node $S_1$ with respect to the symbol $x_2$ sent from $S_2$.

Likewise, the source node $S_1$ receives the symbol $x_2$ using matched filtering:

$$\hat{x}_{2,S_1} = (H_0^T p_2)^H y_{S_1} \quad (18)$$
$$= p_2^H H_0^* H_0^T p_2 x_2 + p_2^H H_0^* n_{S_2}$$

Thus, the reception SNR of the source node $S_1$ with respect to the transmitter signal $S_2$ is:

$$\gamma_{2,S_1} = \frac{\|p_2^H H_0^* H_0^T p_2\|_F^2}{\|p_2^H H_0^*\|_F^2 \sigma^2} = \frac{\|H_0^T p_2\|_F^2}{\sigma^2} \quad (19)$$

Where $\|\cdot\|_F$ denotes a norm, and $\sigma$ denotes noise power.

Transmission Phase III

In the third transmission phase, $S_2$ forwards to the target node a transmittion signal estimated value $\hat{x}_{1,S_2}$ from $S_1$ as received in the first phase. To meet transmission power restrictions of a transmit node, an amplify-and-forward coefficient $\beta_{1,S_2}$ needs to be set such that the power of the forwarded signal meets a normalization condition $|\beta_{1,S_2} \hat{x}_{1,S_2}| = 1$. As obtained from the above analysis, the SNR in a reception signal $\hat{x}_{1,S_2}$ of the source node $S_2$ is $\gamma_{1,S_2}$. Then in the forwarded signal, the power of the signal portion is $$\frac{\gamma_{1,S_2}}{\gamma_{1,S_2} + 1},$$

and the power of the noise portion is $$\frac{1}{\gamma_{1,S_2} + 1}.$$

In the third transmission phase, the source node $S_2$ forwards to the target node the transmitter signal estimated value $\hat{x}_{1,S_2}$ from $S_1$ which has been power-normalized. $S_2$ adopts a closed loop transmission mode, and uses the first right singular vector of the channel transfer matrix from $S_2$ to the target node as the precoding vector that is used when $S_2$ forwards the transmitter signal of $S_1$; the target node uses the conjugate transpose vector of the first column of the U matrix resulting from SVD-deposing the corresponding channel matrix for reception. That is, the reception signal of the target node is:

$$y_{x_1,D} = U_2^H(:,1)[H_2 V_2(:,1)\beta_{1,S_2} \hat{x}_{1,S_2} + n_D] \quad (20)$$
$$= S_2(1,1)\beta_{1,S_2} \hat{x}_{1,S_2} + U_2^H(:,1) n_D$$
$$= \lambda_{2,1} \beta_{1,S_2} \hat{x}_{1,S_2} + U_2^H(:,1) n_D$$

Where $U_2$, $S_2$ and $V_2$ result from SVD decomposition of $H_2$, i.e., equation (13) is satisfied; the first diagonal element of $S_2$ is the greatest singular value $\lambda_{2,1}$ of $H_2$; $n_D$ denotes the reception noise of the target node. Then, the reception signal of the target node is as shown by the above equation.

If $\hat{x}_{1,S_2}$ does not contain a noise portion, then the reception SNR of the target node is $$\gamma_2 = \frac{\lambda_{2,1}^2 \beta_{1,S_2}^2}{\sigma^2},$$

wherein $\sigma$ denotes noise power. Thereby, the reception SNR of the target node for $S_2$ forwarding the transmittion symbol of $S_1$ in the third transmission phase can be derived as below:

$$\gamma_3 = \frac{\gamma_2 \cdot \sigma^2 \cdot \frac{\gamma_{1,S_2}}{\gamma_{1,S_2}+1}}{\gamma_2 \cdot \sigma^2 \cdot \frac{1}{\gamma_{1,S_2}+1} + \sigma^2} \quad (21)$$
$$= \frac{\gamma_2 \cdot \frac{\gamma_{1,S_2}}{\gamma_{1,S_2}+1}}{\gamma_2 \cdot \frac{1}{\gamma_{1,S_2}+1} + 1}$$
$$= \frac{\gamma_2 \gamma_{1,S_2}}{\gamma_2 + \gamma_{1,S_2} + 1}$$

and $$\frac{\gamma_2 \gamma_{1,S_2}}{\gamma_2 + \gamma_{1,S_2} + 1} \approx \min(\gamma_2, \gamma_{1,S_2}) \quad (22)$$

Now the target node has two estimates of the transmittion symbol $x_1$ of the source node $S_1$: one is transmitted by the source node $S_1$ directly to the target node in the transmission phase I; and the other is forwarded by the source node $S_2$ to the target node in the transmission phase III. After applying a maximal ratio combining mode to the two estimates of the transmittion symbol $x_1$, the target node obtains the signal reception SNR as below:

$$\rho_{x_1,D} = \frac{\|H_1 p_1\|_F^2}{\sigma^2} + \frac{\gamma_2 \frac{\|H_0 p_1\|_F^2}{\sigma^2}}{\gamma_2 + \frac{\|H_0 p_1\|_F^2}{\sigma^2} + 1} \qquad (23)$$

$$\approx \frac{\|H_1 p_1\|_F^2}{\sigma^2} + \min\left[\gamma_2, \frac{\|H_0 p_1\|_F^2}{\sigma^2}\right]$$

Where $\|\cdot\|_F$ denotes a norm, and $\sigma$ denotes noise power.

Generally speaking, $\lambda_{0,min}^2 \leq \|H_0 p_1\|_F^2 \leq \lambda_{0,1}^2$ is satisfied, where $\lambda_{0,min}$ and $\lambda_{0,1}$ denote the minimum and the maximum singular value of the channel transfer matrix $H_0$, respectively. Based thereon, the equation (13) may be further simplified as:
If $$\lambda_{0,1}^2 \frac{1}{\sigma^2} < \gamma_2,$$

then the equation (13) may be simplified as $$\rho_{x_1,D} \approx \frac{\|H_1 p_1\|_F^2}{\sigma^2} + \frac{\|H_0 p_1\|_F^2}{\sigma^2}.$$

If $$\lambda_{0,min}^2 \frac{1}{\sigma^2} > \gamma_2,$$

then the equation (13) may be simplified as $$\rho_{x_1,D} \approx \frac{\|H_1 p_1\|_F^2}{\sigma^2} + \gamma_2.$$

If $$\lambda_{0,min}^2 \frac{1}{\sigma^2} < \gamma_2 < \lambda_{0,1}^2 \frac{1}{\sigma^2},$$

then the equation (13) is simplified according to the real-time channel condition.

A design method of $p_1$ can be derived from the above judgment branches. The design principle of $p_1$ is to maximize the reception SNR of the transmittion symbol $x_1$ of the source node $S_1$ at the target node. Therefore, in view of the above simplification analysis on $\rho_{x_1,D}$, the design principle of $p_1$ may be further simplified as:
If $$\lambda_{0,1}^2 \frac{1}{\sigma^2} < \gamma_2,$$

then the design principle of $p_1$ is:

$$p_1 = \max_{p_1} \rho_{x_1,D} \qquad (24)$$

$$= \max_{p_1}\left[\frac{\|H_1 p_1\|_F^2}{\sigma^2} + \frac{\|H_0 p_1\|_F^2}{\sigma^2}\right]$$

In this case, the precoding at the source node $S_1$ may be further designed as:
Let $$W = H_1^H H_1 + H_0^H H_0 \qquad (25)$$

And subject it to SVD decomposition:

$$U_w S_w V_w^H = W \qquad (26)$$

w is a conjugate symmetric matrix, i.e. $W^H = W$, so $U_w = V_w$. At this point, in order to maximize $\|H_1 p_1\|_F^2 + \|H_0 p_1\|_F^2$, let $$p_1 = U_w(:,1) \qquad (27)$$

If $$\lambda_{0,min}^2 \frac{1}{\sigma^2} > \gamma_2,$$

then the design principle of $p_1$ is:

$$p_1 = \max_{p_1} \rho_{x_1,D} \qquad (28)$$

$$= \max_{p_1}\left[\frac{\|H_1 p_1\|_F^2}{\sigma^2} + \gamma_2\right]$$

However, under given channel conditions $\gamma_2$ is a fixed value, so the design principle of $p_1$ may further be simplified as:

$$p_1 = \max_{p_1} \frac{\|H_1 p_1\|_F^2}{\sigma^2} \qquad (29)$$

In this case, the precoding at the source node $S_1$ may be further designed as:
Let:

$$W'' = H_1^H H_1 \qquad (30)$$

And subject it to SVD decomposition:

$$U_w'' S_w'' V_w''^H = W'' \qquad (31)$$

Since $W''$ is also a conjugate symmetric matrix, in order to maximize $\|H_1 p_1\|_F^2$, let:

$$p_1 = U_w''(:,1) \qquad (32)$$

If $$\lambda_{0,min}^2 \frac{1}{\sigma^2} < \gamma_2 < \lambda_{0,1}^2 \frac{1}{\sigma^2},$$

then according to the real-time channel condition judgment is made by the equation (23) as to whether, the design policy of $p_1$ should conform to the equation (24) or the equation (28), whereby it can be obtained accordingly that the design scheme of $p_1$ (the optimal precoding should be selected) should conform to the equation (27) or (32).

After obtaining the design policy of $p_1$ under concrete channel conditions, the optimal precoding $p_1$ is selected, and thereby the target node's reception SNR for the transmitter signal $x_1$ of the source node $S_1$ can be calculated accurately. The distributed precoding design policy at the source node $S_1$ in the transmission phase I has been presented above.

Transmission Phase IV

Like the third transmission phase, in the fourth transmission phase, the source node $S_1$ forwards to the target node an estimated value $\hat{x}_{2,S_1}$ of the transmitter signal $x_2$ from $S_2$ as received in the second phase. Similarly, an amplify-and-forward coefficient $\beta_{2,S_1}$ that is set when transmitting $\hat{x}_{2,S_1}$ should make the power of the forwarded signal meets a normalization condition $|\beta_{2,S_1} \cdot \hat{x}_{2,S_1}|=1$. In the reception signal $\hat{x}_{2,S_1}$ at the source node $S_1$, the SNR is $\gamma_{1,S_2}$. Then in the forwarded signal, the power of the signal portion is $$\frac{\gamma_{2,S_1}}{\gamma_{2,S_1}+1},$$

and the power of the noise portion is $$\frac{1}{\gamma_{2,S_1}+1}.$$

In the fourth transmission phase, the source node $S_1$ forwards to the target node the transmitter signal estimated value $\hat{x}_{2,S_1}$ from $S_2$ which has been power-normalized. $S_1$ adopts a closed loop transmission mode, and uses the first right singular vector of the channel transfer matrix from $S_1$ to the target node as the precoding vector that is used when $S_1$ forwards the transmitter signal of $S_2$; the target node uses the conjugate transpose vector of the first column of the U matrix resulting from SVD-deposing the corresponding channel matrix for reception. That is, the reception signal of the target node is:

$$y_{x_2,D} = U_1^H(:;1)[H_1 V_1(:;1)\beta_{2,S_1}\hat{x}_{2,S_1} + n_D] \quad (33)$$
$$= S_1(1,1)\beta_{2,S_1}\hat{x}_{2,S_1} + U_1^H(:;1)n_D$$
$$= \lambda_{1,1}\beta_{2,S_1}\hat{x}_{2,S_1} + U_1^H(:;1)n_D$$

Where $U_1$, $S_1$ and $V_1$ result from SVD decomposition of $H_1$, i.e., the equation (6) is satisfied; the first diagonal element of $S_1$ is the greatest singular value $\lambda_{1,1}$ of $H_1$; $n_D$ denotes the reception noise of the target node. Then, the reception signal of the target node is as shown by the above equation.

If $\hat{x}_{2,S_1}$ does not contain a noise portion, then the reception SNR of the target node is $$\gamma_1 = \frac{\lambda_{1,1}^2 \beta_{2,S_1}^2}{\sigma^2},$$

wherein $\sigma$ denotes noise power. Thereby, the reception SNR of the target node for $S_1$ forwarding the transmittion symbol of $S_2$ in the fourth transmission phase can be derived as below:

$$\gamma_4 = \frac{\gamma_1 \cdot \sigma^2 \cdot \frac{\gamma_{2,S_1}}{\gamma_{2,S_1}+1}}{\gamma_1 \cdot \sigma^2 \cdot \frac{1}{\gamma_{2,S_1}+1} + \sigma^2} \quad (34)$$
$$= \frac{\gamma_1 \cdot \frac{\gamma_{2,S_1}}{\gamma_{2,S_1}+1}}{\gamma_1 \cdot \frac{1}{\gamma_{2,S_1}+1} + 1}$$
$$= \frac{\gamma_1 \gamma_{2,S_1}}{\gamma_1 + \gamma_{2,S_1} + 1}$$

and $$\frac{\gamma_1 \gamma_{2,S_1}}{\gamma_1 + \gamma_{2,S_1} + 1} \approx \min(\gamma_1, \gamma_{2,S_1}) \quad (35)$$

Now the target node has two estimates of the transmittion symbol $x_2$ of the source node $S_2$: one is transmitted by the source node $S_2$ directly to the target node in the transmission phase II; and the other is forwarded by the source node $S_1$ to the target node in the transmission phase IV. After applying a maximal ratio combining mode to the two estimates of the transmittion symbol $x_2$, the target node obtains the signal reception SNR as below:

$$\rho_{x_2,D} = \frac{\|H_2 p_2\|_F^2}{\sigma^2} + \frac{\gamma_1 \frac{\|H_0 p_2\|_F^2}{\sigma^2}}{\gamma_1 + \frac{\|H_0 p_2\|_F^2}{\sigma^2} + 1} \quad (36)$$
$$\approx \frac{\|H_2 p_2\|_F^2}{\sigma^2} + \min\left[\gamma_1, \frac{\|H_0 p_2\|_F^2}{\sigma^2}\right]$$

Where $\|\sim\|_F$ denotes a norm, and $\sigma$ denotes noise power.

Generally speaking, $\lambda_{0,min}^2 \leq \|H_0 p_2\|_F^2 \leq \lambda_{0,1}^2$ is satisfied, where $\lambda_{0,min}$ and $\lambda_{0,1}$ denote the minimum and the maximum singular value of the channel transfer matrix $H_0$, respectively. Based thereon, it may be further simplified as:

If $$\lambda_{0,1}^2 \frac{1}{\sigma^2} < \gamma_1,$$

then the equation may be simplified as $$\rho_{x_2,D} \approx \frac{\|H_2 p_2\|_F^2}{\sigma^2} + \frac{\|H_0 p_2\|_F^2}{\sigma^2}.$$

If $$\lambda_{0,min}^2 \frac{1}{\sigma^2} > \gamma_1,$$

then the equation may be simplified as $$\rho_{x_2,D} \approx \frac{\|H_2 p_2\|_F^2}{\sigma^2} + \gamma_1.$$

If $$\lambda_{0,min}^2 \frac{1}{\sigma^2} < \gamma_1 < \lambda_{0,1}^2 \frac{1}{\sigma^2},$$

then the equation is simplified according to the real-time channel condition.

A design method of $p_2$ can be derived from the above judgment branches. The design principle of $p_2$ is to maximize the reception SNR of the transmittion symbol $x_2$ of the source node $S_2$ at the target node. Therefore, in view of the above simplification analysis on $\rho_{x_2,D}$, the design principle of $p_2$ may be further simplified as:

If $$\lambda_{0,1}^2 \frac{1}{\sigma^2} < \gamma_1,$$

then the design principle of $p_2$ is:

$$p_2 = \max_{p_2} \rho_{x_2,D} = \max_{p_2} \frac{\|H_2 p_2\|_F^2}{\sigma^2} + \frac{\|H_0 p_2\|_F^2}{\sigma^2} \quad (37)$$

In this case, the precoding at the source node $S_2$ may be further designed as:

Let $$W = H_2^H H_2 + H_0^H H_0 \quad (38)$$

And subject it to SVD decomposition:

$$U_w S_w V_w^H = W \quad (39)$$

w is a conjugate symmetric matrix, i.e. $W^H = W$, so $U_w = V_w$. At this point, in order to maximize $\|H_2 p_2\|_F^2 + \|H_0 p_2\|_F^2$, let $$p_2 = U_w(:,1) \quad (40)$$

If $$\lambda_{0,min}^2 \frac{1}{\sigma^2} > \gamma_1,$$

then the design principle of $p_2$ is:

$$p_2 = \max_{p_2} \rho_{x_2,D} = \max_{p_2} \left[ \frac{\|H_2 p_2\|_F^2}{\sigma^2} + \gamma_1 \right] \quad (41)$$

However, under given channel conditions $\gamma_1$ is a fixed value, so the design principle of $p_2$ may further be simplified as:

$$p_2 = \max_{p_2} \frac{\|H_2 p_2\|_F^2}{\sigma^2} \quad (42)$$

In this case, the precoding at the source node $S_2$ may be further designed as:

Let:

$$W'' = H_2^H H_2 \quad (43)$$

And subject it to SVD decomposition:

$$U_w'' S_w'' V_w''^H = W'' \quad (44)$$

Since $W''$ is also a conjugate symmetric matrix, in order to maximize $\|H_2 p_2\|_F^2$, let:

$$p_2 = U_w''(:,1) \quad (45)$$

If $$\lambda_{0,min}^2 \frac{1}{\sigma^2} < \gamma_1 < \lambda_{0,1}^2 \frac{1}{\sigma^2},$$

then according to the real-time channel condition judgment is made by the equation (36) as to whether the design policy of $p_2$ should conform to the equation (37) or (41), whereby it can be obtained accordingly that the design scheme of $p_2$ (the optimal precoding should be selected) should conform to the equation (40) or (45).

After obtaining the design policy of $p_2$ under concrete channel conditions, the optimal precoding $p_2$ is selected to substitute into the equation (36), and thereby the target node's reception SNR for the transmitter signal $x_2$ of the source node $S_2$ can be calculated accurately. The distributed precoding design policy at the source node $S_2$ in the transmission phase II has been presented above.

Presented below are a series of simulation results that have been obtained from implementing the above direct access scheme and cooperation access scheme.

Figure 3:
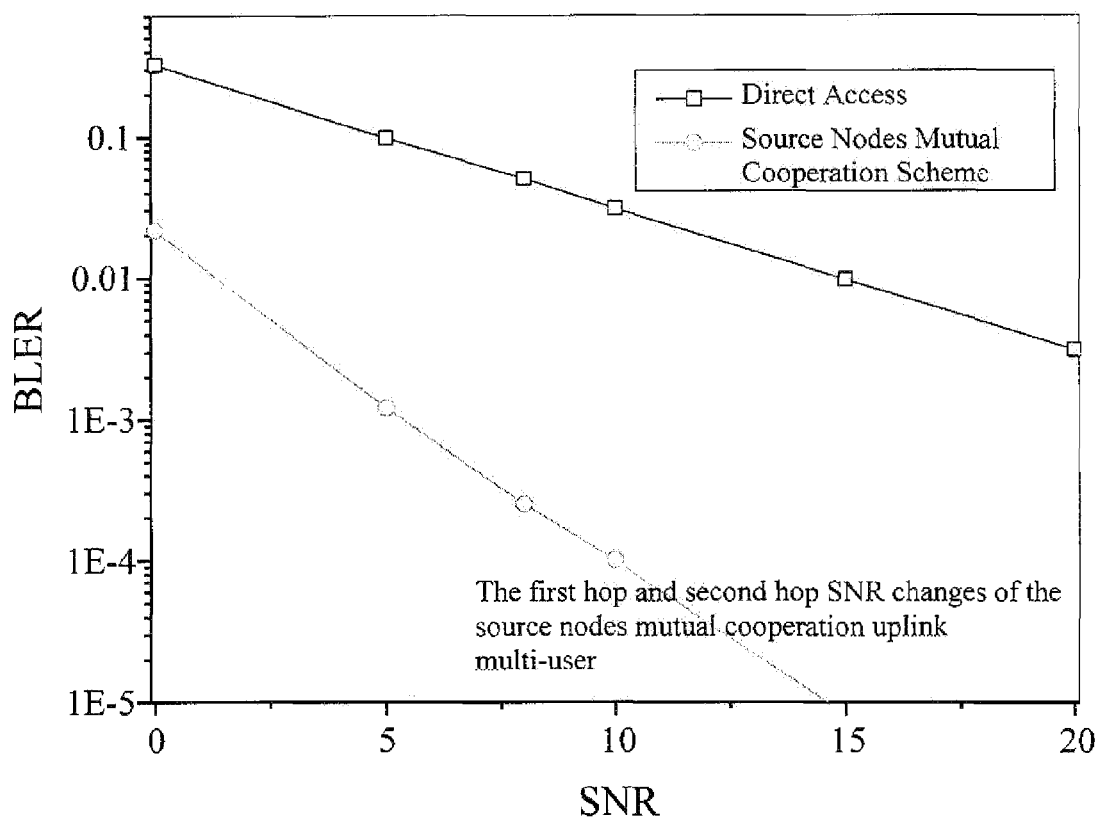
FIG. 3 shows a schematic view of a comparison of Block Error Rate performance between the cooperation access scheme and the direct access scheme in the course of consistency change of average SNR from the two source nodes to the target node.

FIG. 3 shows a comparison of Block Error Rate (BLER) performance between the cooperation access scheme and the direct access scheme in the course of consistency change of average Signal to Noise Ratio (SNR) from the two source nodes to the target node.

Figure 4:
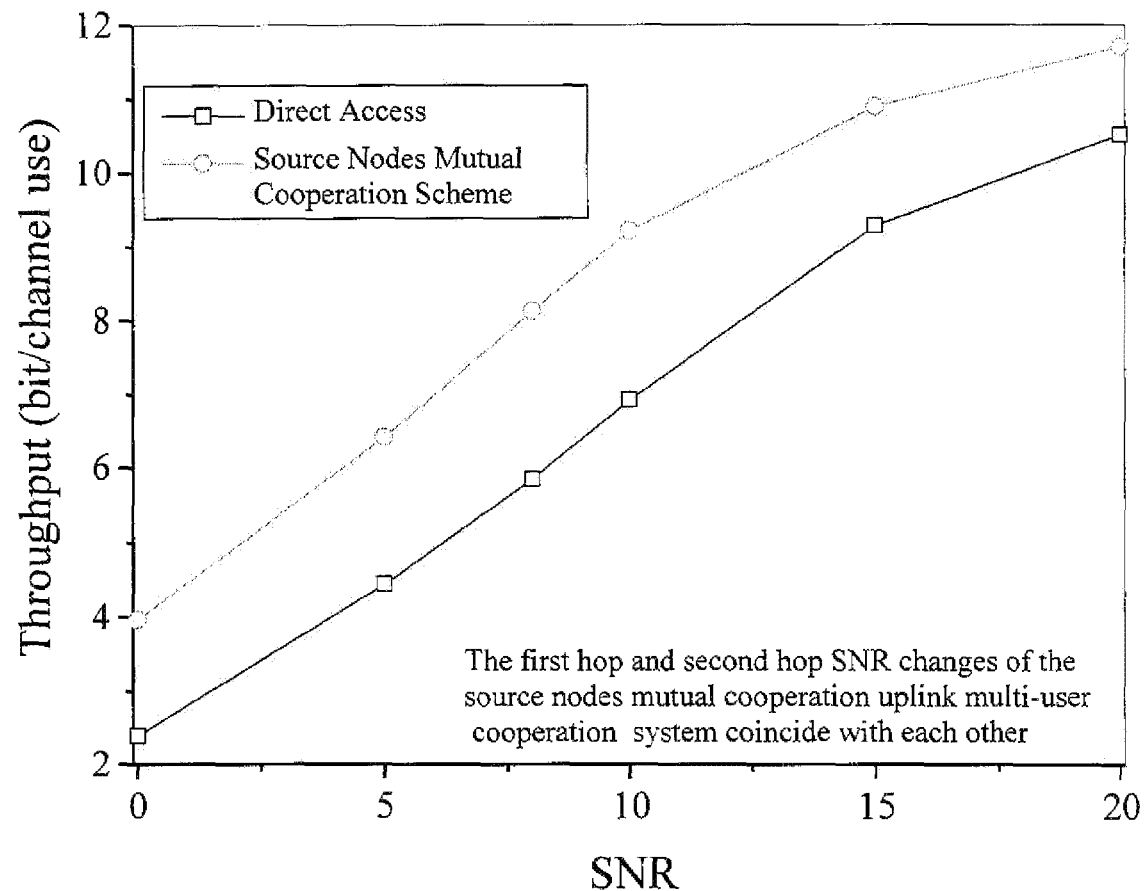
FIG. 4 shows a schematic view of a comparison of throughput performance between the cooperation access scheme and the direct access scheme in the course of consistency change of average SNR from the two source nodes to the target node.

FIG. 4 shows a comparison of throughput performance between the cooperation access scheme and the direct access scheme in the course of consistency change of average Signal to Noise Ratio (SNR) from the two source nodes to the target node.

Figure 5:
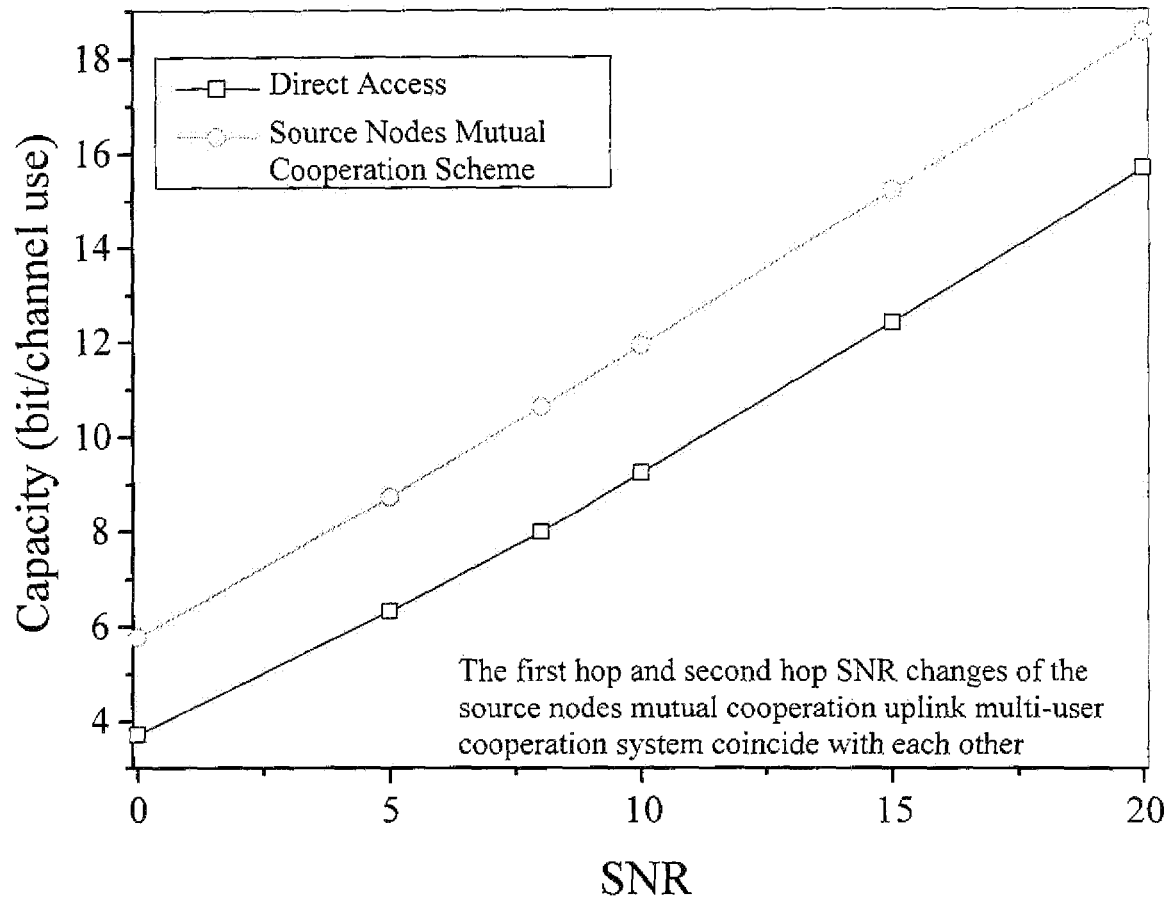
FIG. 5 shows a schematic view of a comparison of capacity performance between the cooperation access scheme and the direct access scheme in the course of consistency change of average SNR from the two source nodes to the target node.

FIG. 5 shows a comparison of capacity performance between the cooperation access scheme and the direct access scheme in the course of consistency change of average Signal to Noise Ratio (SNR) from the two source nodes to the target node.

Figure 6:
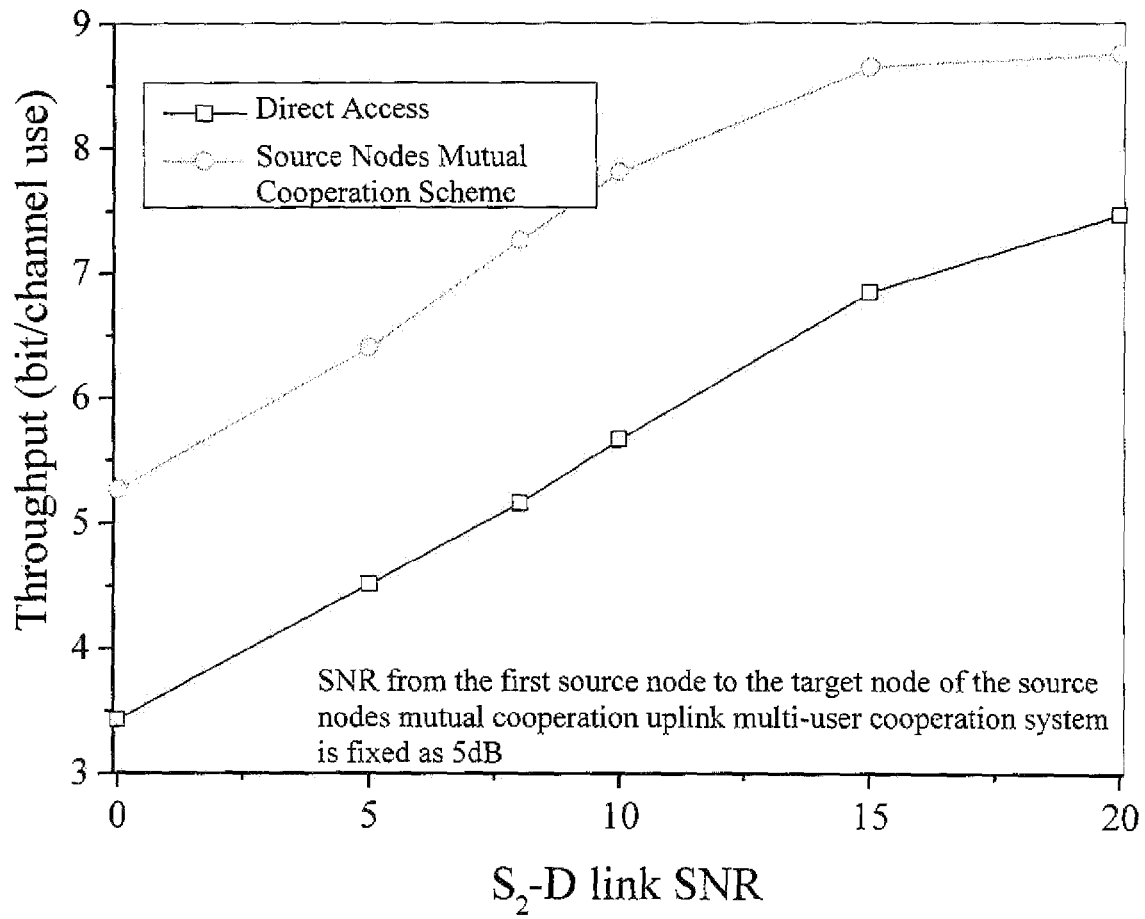
FIG. 6 shows a schematic view of a comparison of throughput performance between the cooperation access scheme and the direct access scheme when fixing the average SNR of a channel from the first source node to the target node as 5 dB and gradually increasing the average SNR of a channel from the second source node to the target node.

FIG. 6 shows a comparison of throughput performance between the cooperation access scheme and the direct access scheme when fixing the average SNR of a channel from the first source node to the target node as 5 dB and gradually increasing the average SNR of a channel from the second source node to the target node ($S_2$-D link SNR).

Figure 7:
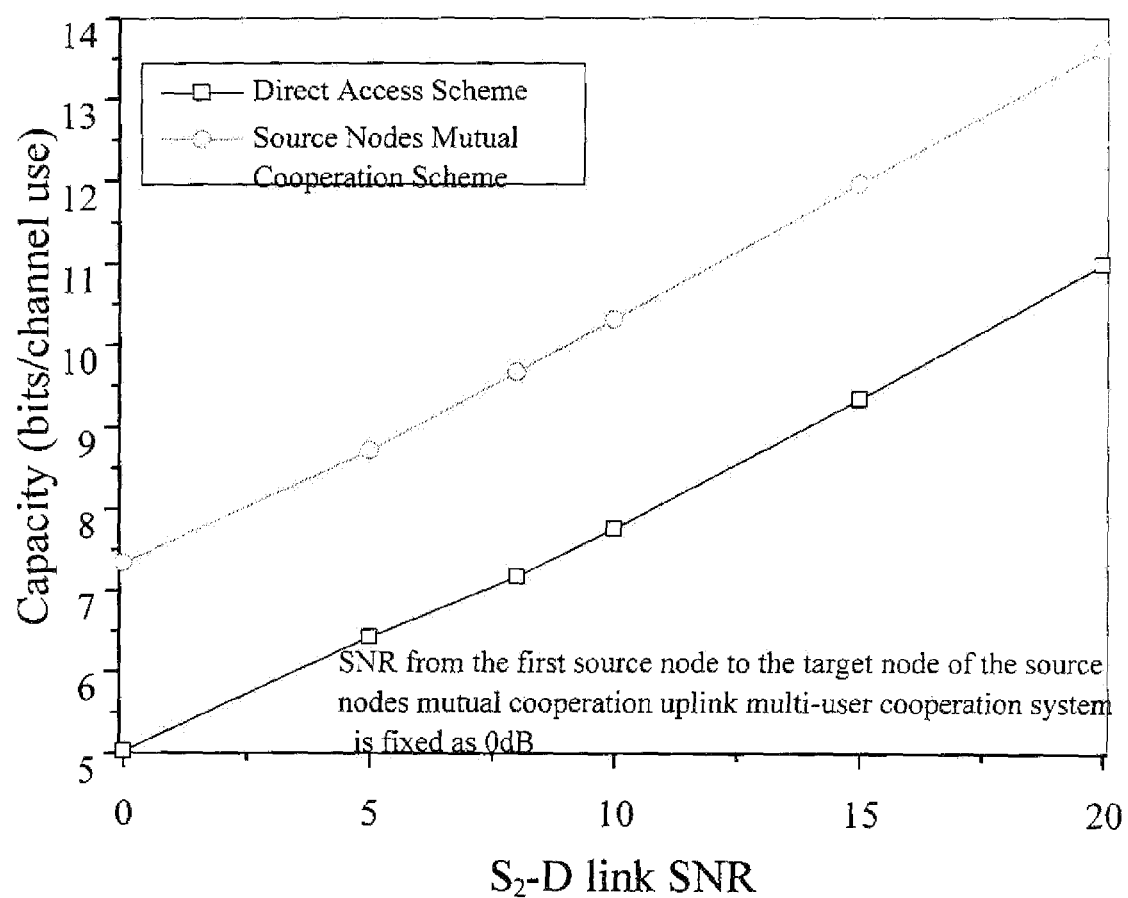
FIG. 7 shows a schematic view of a comparison of capacity performance between the cooperation access scheme and the direct access scheme when fixing the average SNR of a channel from the first source node to the target node as 0 dB and gradually increasing the average SNR of a channel from the second source node to the target node.

FIG. 7 shows a comparison of capacity performance between the cooperation access scheme and the direct access scheme when fixing the average SNR of a channel from the first source node to the target node as 0 dB and gradually increasing the average SNR of a channel from the second source node to the target node ($S_2$-D link SNR).

It can be seen that the cooperation access scheme of the present invention overmatches the existing direct access scheme either the capacity performance, throughput performance or the BLER performance, and can effectively enhance the capacity and throughput of the system and reduce the block error rate.

Several preferred embodiments of the present invention have been illustrated and described. As mentioned above, it should be understood that the present invention is not limited to the form being disclosed, should not be construed as excluding other embodiments but can be applied to other combinations, modifications and environments, and can be altered in view of the above teaching or techniques or knowledge in relevant art within the invention concept. Any alteration and change made by those skilled in the art should not depart from the spirit and scope of the present invention and fall within the protection scope of the appended claims.

INDUSTRIAL APPLICABILITY

Before transmission, there exists no fixed relay node in the network, and the two source nodes are in an equivalent place, i.e., they both need to transfer their information to the target node. During transmission, the source nodes build a cooperative relationship, each of them assumes the signal relay transmission task of the other source node, and the source nodes may exchange information. By virtue of the cooperative relationship between the source nodes, the transmission role of the source node is not fixed; that is the source node may act as a temporary relay node in some specific transmission phases. In this manner, it is possible to effectively enhance the capacity and throughput of the system and reduce the block error rate.

The invention claimed is:

1. A method for uplink multi-user cooperation communication, characterized by being applied in a system at least including a first source node, a second source node and a target node, wherein there is a direct transmission link between either the first or the second source node and the target node; the method comprising the steps of:
  when transmitting a signal to the target node, the first source node also transmitting the signal to the second source node, the second source node changing to a relay node of the first source node and forwarding the signal to the target node;
  the target node estimating reception Signal Noise Ratio (SNR) by using a maximal ratio combining mode according to the signal directly transmitted from the first source node and the signal forwarded from the second source node, setting a precoding policy according to the estimated reception SNR, and selecting, based on real-time channel conditions, an optimal precoding as a precoding vector which is used when the first source node transmits a signal to the target node.

2. The method according to claim 1, characterized in that the step of the first source node also transmitting a signal to the second source node when transmitting the signal to the target node further comprises:
  the first source node transmitting the signal to the target node and the second source node after precoding-processing the signal with an initially set first precoding vector, the first precoding vector adopting a first right singular vector of a channel transfer matrix of a direct transmission link between the first source node and the target node.

3. The method according to claim 2, characterized in that, the first right singular vector of the channel transfer matrix is obtained by singular value decomposing the channel transfer matrix of the direct transmission link between the first source node and the target node.

4. The method according to claim 1, characterized in that, both the target node and the second source node adopt a matched filtering mode to receive the signal transmitted from the first source node.

5. The method according to claim 2, characterized in that, both the target node and the second source node adopt a matched filtering mode to receive the signal transmitted from the first source node.

6. The method according to claim 1, characterized in that, both the first source node and the second source node adopt a closed loop transmission mode to transmit signals.

7. The method according to claim 1, characterized in that the step of the second source node changing to a relay node of the first source node and forwarding the signal to the target node further comprises:
  the second source node normalizing the received signal, precoding-processing the received signal with an initially set second precoding vector and then forwarding it to the target node, the second precoding vector adopting a first right singular vector of a channel transfer matrix of a direct transmission link between the second source node and the target node.

8. The method according to claim 7, characterized in that, the first right singular vector of the channel transfer matrix is obtained by singular value decomposing the channel transfer matrix of the direct transmission link between the second source node and the target node.

9. The method according to claim 7, characterized in that the second source node normalizing the received signal further comprises:
  setting an amplify-and-forward coefficient such that the signal forwarded by the second source node meets a normalization condition.

10. The method according to claim 7, characterized in that the step of the second source node changing to a relay node of the first source node and forwarding the signal to the target node further comprises:
  obtaining a U matrix by singular-value-decomposing the channel transfer matrix of the direct transmission link between the second source node and the target node, the target node using a conjugate transpose vector of the first column of the U matrix to receive the signal forwarded by the second source node.

11. The method according to claim 1, characterized in that, the step of selecting the optimal precoding as a precoding vector which is used when the first source node transmits a signal to the target node comprises: selecting the optimal precoding as a first precoding vector;
  after selecting the optimal precoding as a precoding vector which is used when the first source node transmits a signal to the target node, further comprising: obtaining reception Signal to Noise Ratio of the target node under a current channel condition according to the optimal precoding.

* * * * *